March 29, 1927.
J. GOLLBACH
1,623,001
MACHINE FOR TREATING GRAIN WITH COPPER CARBONATE
Filed July 19, 1926  2 Sheets-Sheet 1
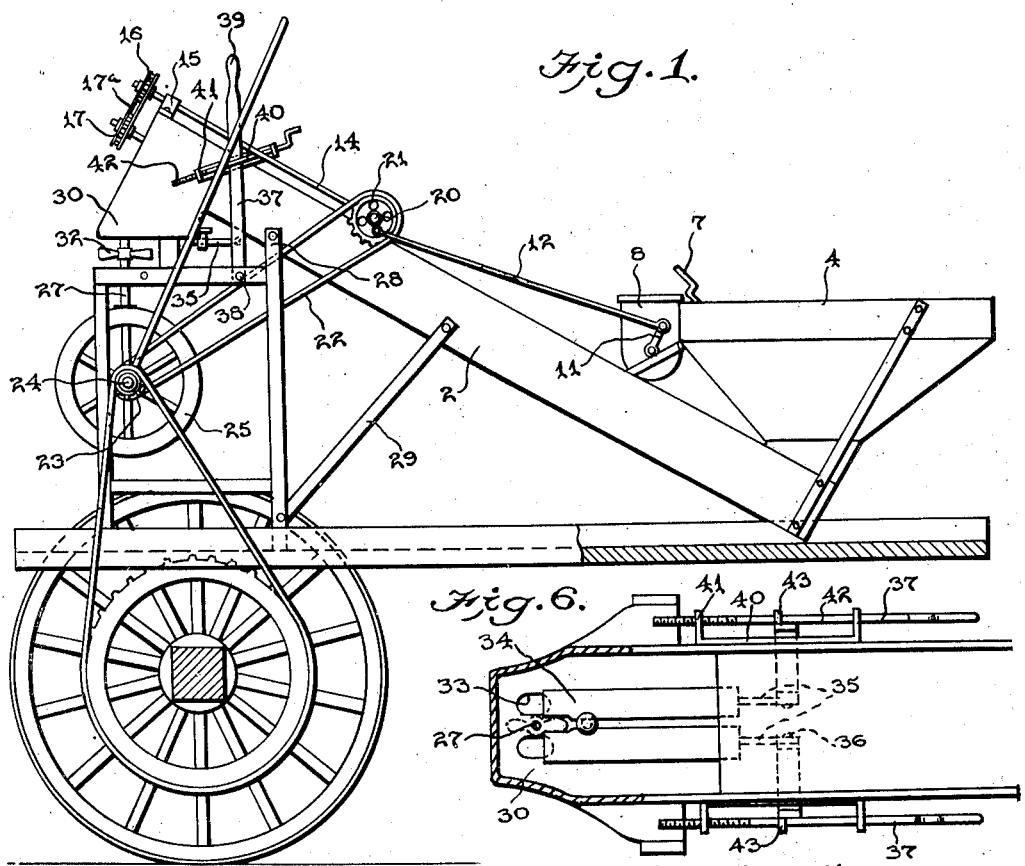
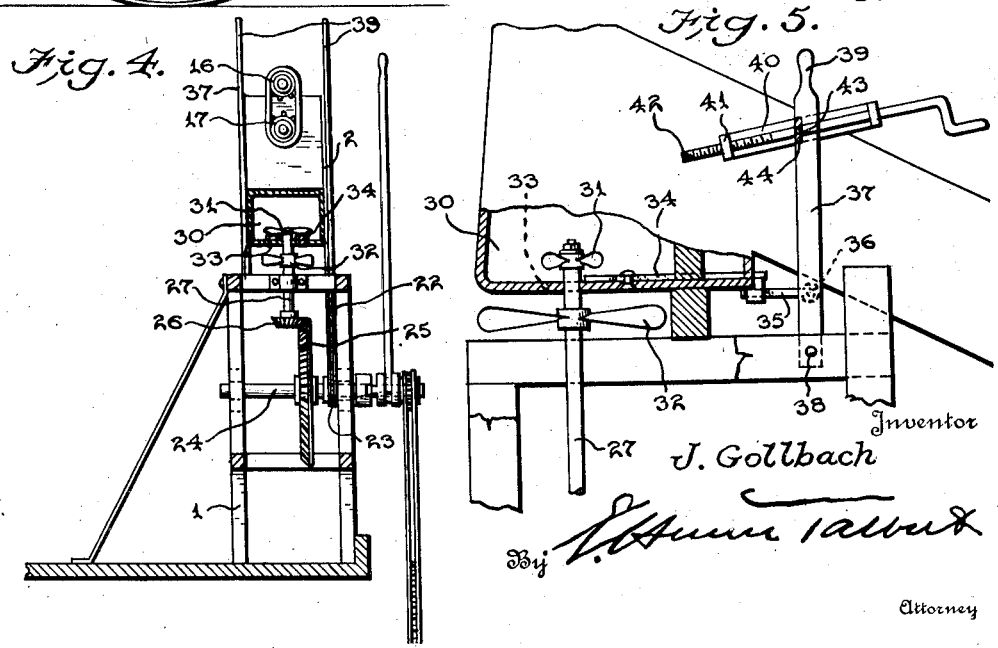
Inventor
J. Gollbach
By
Attorney March 29, 1927.

J. GOLLBACH 1,623,001

MACHINE FOR TREATING GRAIN WITH COPPER CARBONATE

Filed July 19, 1926    2 Sheets-Sheet 2

Inventor
J. Gollbach

By
Attorney

Patented Mar. 29, 1927.

1,623,001

UNITED STATES PATENT OFFICE.

JOSEPH GOLLBACH, OF EAST NICOLAUS, CALIFORNIA.

MACHINE FOR TREATING GRAIN WITH COPPER CARBONATE.

Application filed July 19, 1926. Serial No. 123,478.

The present invention has for its purpose to provide, in a machine for treating grain with copper carbonate for sowing purposes, wherein the grain is fed into a hopper at one end of the machine, the copper carbonate subsequently being fed into a chamber having a mixing screw which conveys the grain to and mixes it with the copper carbonate.

Another purpose is to provide means for regulating the passage of the grain from the hopper to the chute containing the mixing screw.

A further purpose is to provide means for feeding copper carbonate at intervals into the chamber or passage which carries the feeding and mixing screw, so that the copper carbonate may mix with and treat the grain.

A still further purpose is to provide means for permitting the treated grain to pass into a seeder, said means consisting of a screw-actuated slide valve.

The invention comprises further features and combinations of parts to be hereinafter set forth, shown in the drawings and claimed.

In the drawings:

Figure 1 is a view in side elevation of the improved grain treating machine.

Figure 4 is a transverse sectional view on line 4—4 of Figure 2.

Figure 5 is an enlarged detail elevational view, partly broken away, of the seeder chamber and associated parts.

Figure 6 is a partial plan and horizontal sectional view of the structure shown in Figure 5.

Figure 3:
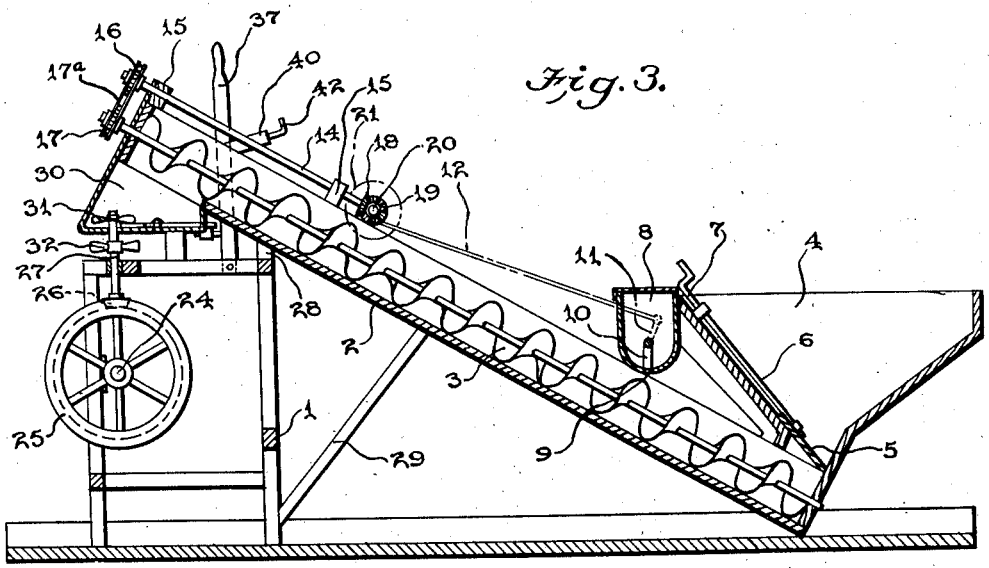
Figure 3 is a longitudinal sectional view on line 3—3 of Figure 2.
Figure 2:
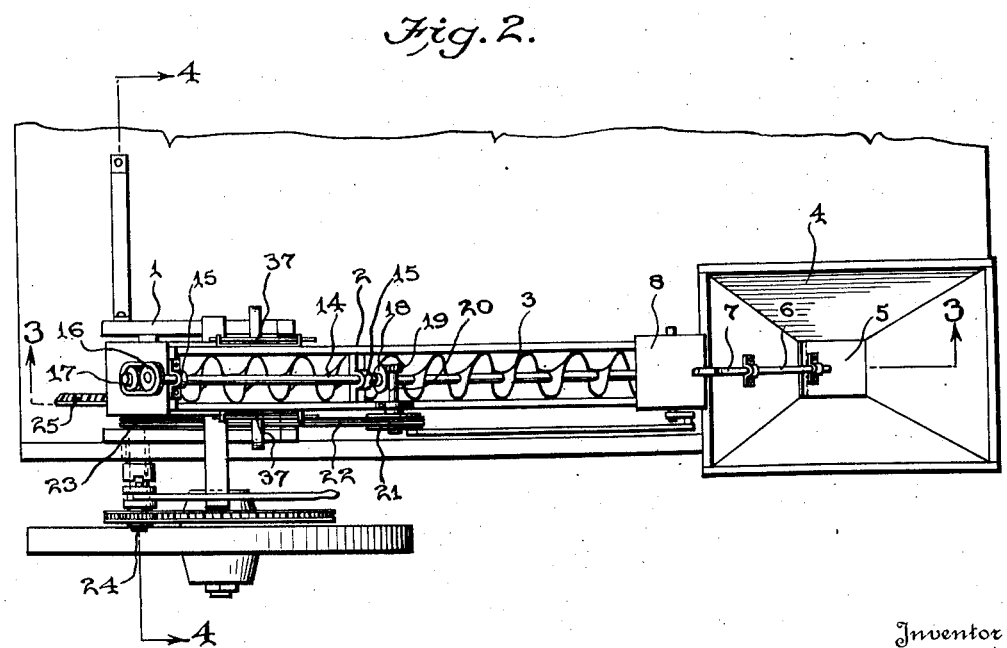
Figure 2 is a plan view of the same.

Referring to the drawings, 1 designates a conventional type of seeder and 2 denotes a conveyor tube or casing having an interior feeding and mixing screw 3. This tube or casing 2 terminates in a hopper 4 at its lower end, there being a slide valve 5 for shutting off or opening up communication between the hopper and the lower end of the tube or chamber 2. A suitable screw 6 is swivelly mounted in the hopper and threadingly connected to the slide valve and has a handle 7, and by operating the screw 6, the slide valve 5 may be opened or closed for the purpose of shutting off or opening up communication between the tube and the hopper.

The grain to be treated with copper carbonate is placed within the hopper and when the slide is opened, it passes through the hopper to the lower end of the tube or chamber 2.

A second hopper 8 is provided for the reception of copper carbonate, there being an opening of communication 9 between this hopper and the tube. A valve 10 controls the passage of the copper carbonate through the opening of communication 9, and through the medium of a crank connection 11, this valve is operated by means of a pitman 12. A second shaft 14 is disposed parallel with the mixing screw 3, being mounted in bearings 15 on the tube or casing 2. At the upper end, the shaft 14 carries a gear 16 operatively connected with a gear 17 on the shaft of the screw 3 by means of a silent chain 17ª.

A bevel gear 18 is carried by the shaft 14 at the lower end and meshes with a bevel gear 19 mounted upon a short shaft 20 disposed transversely of the tube or casing 2, said transverse shaft being provided with a toothed wheel 21, eccentrically of which the pitman 12 is pivotally connected. A silent chain 22 is trained over the toothed wheel 21 and operatively connects it with a toothed wheel 23 on the shaft 24 of the seeder 1, the shaft 24 being provided with a bevel gear 25 meshing with a bevel pinion 26 carried by a vertical shaft 27.

The tube or casing 2 is disposed at an inclination with its upper end communicating with the seeder, a bracket 28 supporting the tube or casing adjacent the upper end and the structure being reinforced by a diagonal brace 29. The upper end of the tube or casing is provided with a chamber 30 into which the treated grain is fed, there being an agitator 31 in said chamber for stirring the treated grain, the agitator being mounted at the upper end of the shaft 27.

Directly below the chamber 30 and mounted upon the shaft 27 there is a distributor 32, the chamber having a discharge opening 33 directly above the distributor, which discharge opening is controlled by a slide valve 34, the latter having a stem 35 which is pivotally connected, as at 36, to the control lever 37, which latter is pivotally mounted, as at 38, on the seeder. The lever 37 is of U-shaped form, the stem being connected with one of the legs and the remaining leg being extended to form a handle 39 which is operatively connected with a regulator consisting of a U-shaped bracket 40 having ears 41 carrying a regulating screw 42, the shank of which is slidably mounted in one of the ears and threadingly engaged with the other, as shown.

The regulating screw 42 is provided with a peripheral recess 43 in which an ear 44 formed on the hand lever may engage. The regulating screw is to regulate the extent of opening of the slide valve 34. When the lever is pushed forward to abut the ear 41 with which the screw is threadingly engaged, the valve is closed, the movement of the lever 37 in the reverse direction serving to open the valve and the extent of opening being determined by the position of the peripheral recess 43 with reference to the bracket 40. The lever has a spring tendency toward the regulating screw to effect engagement of the ear 44 with the recess 43.

The grain to be treated passes from the hopper 4 into the lower end of the tube 2 while the copper carbonate for treating the grain is in the smaller hopper 8. The grain is picked up by the mixing and feeding screw 3, conducted through the tube 2 and is mixed with the copper carbonate which is allowed to enter the tube at intervals through the medium of the valve 10. In the passage of the grain and copper carbonate, the grain and copper carbonate are mixed, the latter acting to treat the grain for sowing purposes, that is, after it passes through the seeder.

The invention having been described, what is claimed as new and useful is:

1. In a grain treating machine, the combination with a seeder, a hopper for the grain, a hopper for copper carbonate, a tube including a passage for the grain and the copper carbonate, and means in the passage for mixing and carrying the grain to the seeder, means for controlling the passage of the grain from the grain hopper to the passage, means for permitting periodical feeding of copper carbonate into said passage, and means for controlling the flow of the treated grain from the passage to the seeder.

2. In a grain treating machine, a seeder, a hopper for copper carbonate, a hopper for grain to be treated, a passage for receiving copper carbonate and grain adjacent one end, means for permitting periodical deposits of copper carbonate into the passage, means in the passage for mixing and feeding the treated grain to the seeder, and a valve for controlling the flow of the treated grain from the passage to the seeder.

3. In a grain treating machine, a seeder, a hopper for copper carbonate, a hopper for grain to be treated, a passage for receiving copper carbonate and grain adjacent one end, means for permitting periodical deposits of copper carbonate into the passage, means in the passage for mixing and feeding the treated grain to the seeder, a valve for controlling the flow of the treated grain from the passage to the seeder, means for operating the seeder, and means for operatively connecting the seeder operating means and the means which permits the copper carbonate to periodically deposit into the passage.

4. In a grain treating machine, a seeder, grain and copper carbonate receiving hoppers, a tube connected with said hoppers and inclined upwardly and over the seeder, a valve in the hopper which receives the copper carbonate, means in the tube for mixing and conveying the grain and copper carbonate through the tube, means at the upper end of the tube for controlling the passage of the treated grain into the seeder, a valve in the copper carbonate hopper, and means for operating the mixing and feeding means and operatively connected with the valve of the copper carbonate hopper for periodically actuating the valve to permit of periodical deposits of copper carbonate into the tube.

5. In a grain treating machine, a seeder, grain and copper carbonate receiving hoppers, a tube connected with said hoppers and inclined upwardly and over the seeder, a valve in the hopper which receives the copper carbonate, means in the tube for mixing and conveying the grain and copper carbonate through the tube, means at the upper end of the tube for controlling the passage of the treated grain into the seeder, a valve in the copper carbonate hopper, and means for operating the mixing and feeding means and operatively connected with the valve of the copper carbonate hopper for periodically actuating the valve to permit of periodical deposits of copper carbonate into the tube.

In testimony whereof he affixes his signature.

JOSEPH GOLLBACH.